Patented Oct. 3, 1933

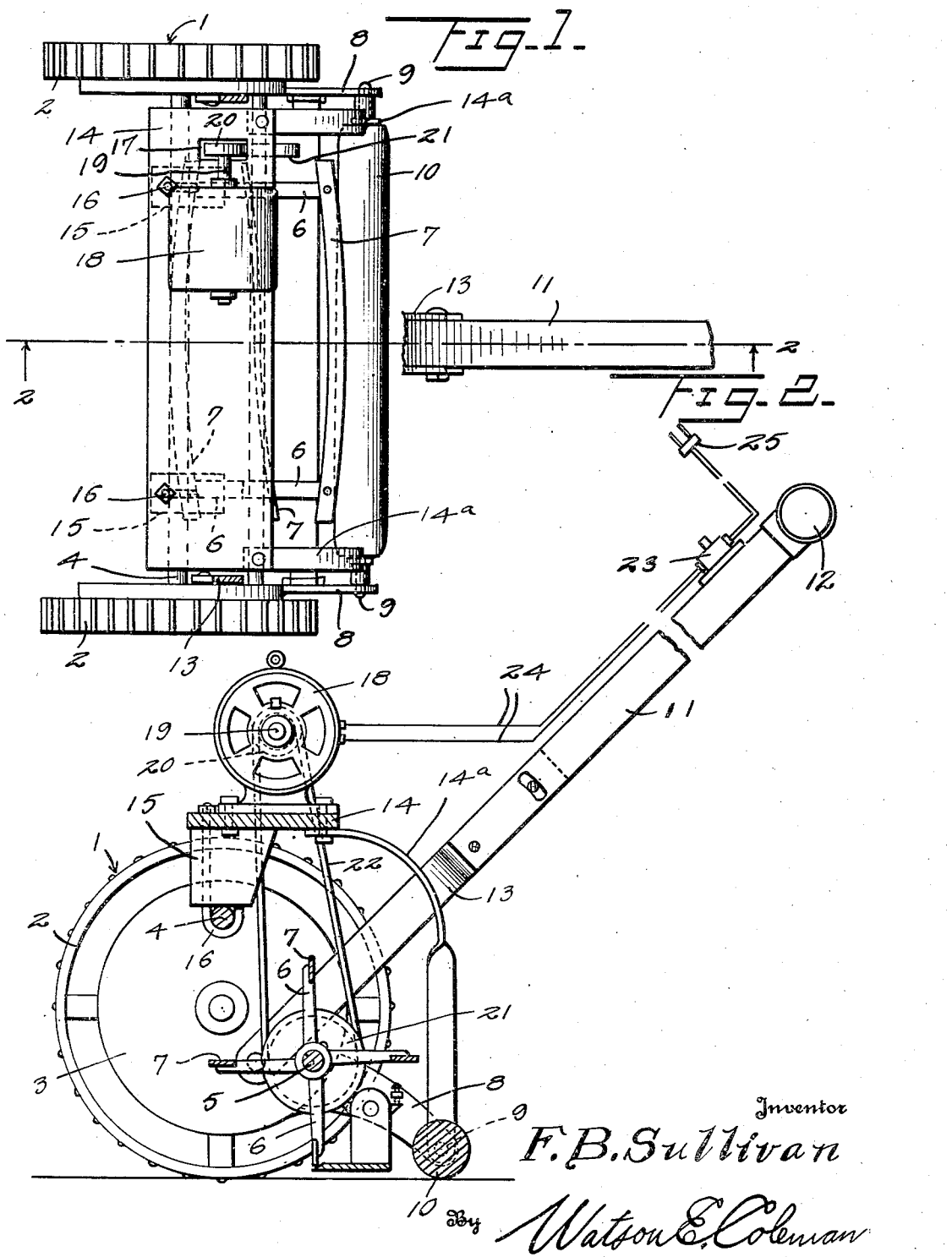

1,929,337

UNITED STATES PATENT OFFICE 1,929,337

LAWN MOWER ATTACHMENT

Frank B. Sullivan, Phoenix, Ariz.

Application December 1, 1931
Serial No. 578,369

1 Claim. (Cl. 56—26)

This invention relates to an attachment for lawn mowers and pertains particularly to means for driving the blades thereof.

The primary object of the present invention is to provide a motor carrying attachment for lawn mowers which is adapted to be easily and quickly applied to any make of lawn mower and which is designed to have its motor connected with the cutting blades of the mower.

Another object of the invention is to provide a blade driving attachment for lawn mowers comprising a motor carrying platform which is adapted to be permanently mounted upon a fixed portion of the mower, and novel means for connecting the platform with the ground engaging roller of the lawn mower to partially support the platform therefrom.

A still further object of the invention is to provide an attachment of the above described character which may be inexpensively constructed and easy to mount in working position.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a view in top plan of a lawn mower equipped with the device embodying the present invention;

Figure 2 is a sectional view taken on the line 2—2 of Figure 1.

Referring now more particularly to the drawing wherein like numerals of reference indicate corresponding parts throughout the several views, the numeral 1 indicates generally a lawn mower of the usual conventional type which comprises a pair of wheel members each of which is indicated by the numeral 2, over the inner face of each of which is positioned a casing 3 which encloses the gear elements of the mower. These casings are connected by the usual brace bar 4 and they also carry therebetween the cutter blade shaft 5 upon which the blades are supported through the medium of the rapidly directed arms 6, the blades on these arms being indicated by the numerals 7.

Each of these casings 3 also has a rearwardly and downwardly directed arm 8 in which is a bearing for the reception of a pivot pin 9 mounted in the adjacent end of the ground engaging roller 10 which is located between these arms. The operating handle 11 to the upper end of which the cross hand grips 12 are attached, is connected at its lower end with the casings 3 by the pivoted arms 13.

The present invention comprises a platform member 14 to the under side of which are secured two or more bearing blocks 15 which are provided to rest upon the brace bar 4, to which they are secured by J-bolts 16, in the manner shown, or in any other suitable manner.

In order to maintain the platform in horizontal position there is secured to the under side thereof and adjacent its rear edge, one end of each of a pair of rearwardly and downwardly curving supporting arms 14a, the lower ends of which are apertured to receive the trunnions 9 of the roller 10. As is shown, these supporting members 14a have their lower halves straight and disposed in substantially vertical position and while they may be formed in several different ways it is preferred that they be made of strap metal which is twisted substantially midway between its ends as shown, so that the lower ends will be arranged in the proper position to be located between an end of the roller and the arm to which the roller is attached and the upper end substantially horizontally disposed so as to position against the under face of the platform.

The platform 14 has a belt opening or slot 17 cut therethrough adjacent one end and mounted upon the platform is an electric motor 18 of suitable horse-power, the shaft 19 of which is provided with a pulley 20 which is located directly over the opening 17.

The cutter blade carrying shaft 5 has secured thereto at the end nearest the motor pulley 20, a pulley 21 which is connected with the motor pulley 20 by means of a suitable belt 22.

Mounted upon the handle 11 of the mower, at a point adjacent the hand grips 12, is a switch 23 of any suitable character, which controls the flow of current through the electric cable 24 to the motor 18, it is of course, understood that this is a double cable of the usual character which conveys the current to the motor and returns it to the source of supply, the switch being located in one side of the cable only. The other end of the double cable is provided with any suitable means for connecting it with a house current line or any other suitable source of supply, there being here shown a push plug 25 of conventional form.

From the foregoing description it will be readily apparent that a lawn mower equipped with the present attachment may be much more easily moved about, particularly through heavy or thick grass, than mowers not equipped with the attachment, as the motor 18 will drive the blades 7 at a greater speed than they would be driven by the usual gear mechanism by which they are connected with the wheels 2 and, therefore, the wheels are relieved of this work and the machine can be much more readily moved about.

Having thus described the invention, what is claimed is:—

In a lawn mower having supporting wheels in wheel frames, a cutter reel rotatably mounted between the wheels, a brace bar between the wheel frames, a supporting roller having end trunnions mounted in said frames and a handle yoke pivotally connected to said frames and extending across said reel, an attachment comprising a platform overlying said bar, means securing said platform to the bar for support in a horizontal position thereon, an electric motor on said platform and having a belt pulley on its armature shaft, a pulley carried by said cutter reel, a belt connecting said pulleys, and a pair of supporting members for the platform each consisting of a bar having a vertical portion provided with an aperture through its lower end through which a roller trunnion loosely extends and an upper portion curved to have its free end extended beneath the platform to which it is secured, said bars being disposed within said yoke and the curved upper ends thereof permitting the free swinging of the yoke thereover.

FRANK B. SULLIVAN.